L. G. DANIELS.
AUTOMATIC LATHE.
APPLICATION FILED AUG. 28, 1918.
1,393,205.
Patented Oct. 11, 1921.
3 SHEETS—SHEET 1.
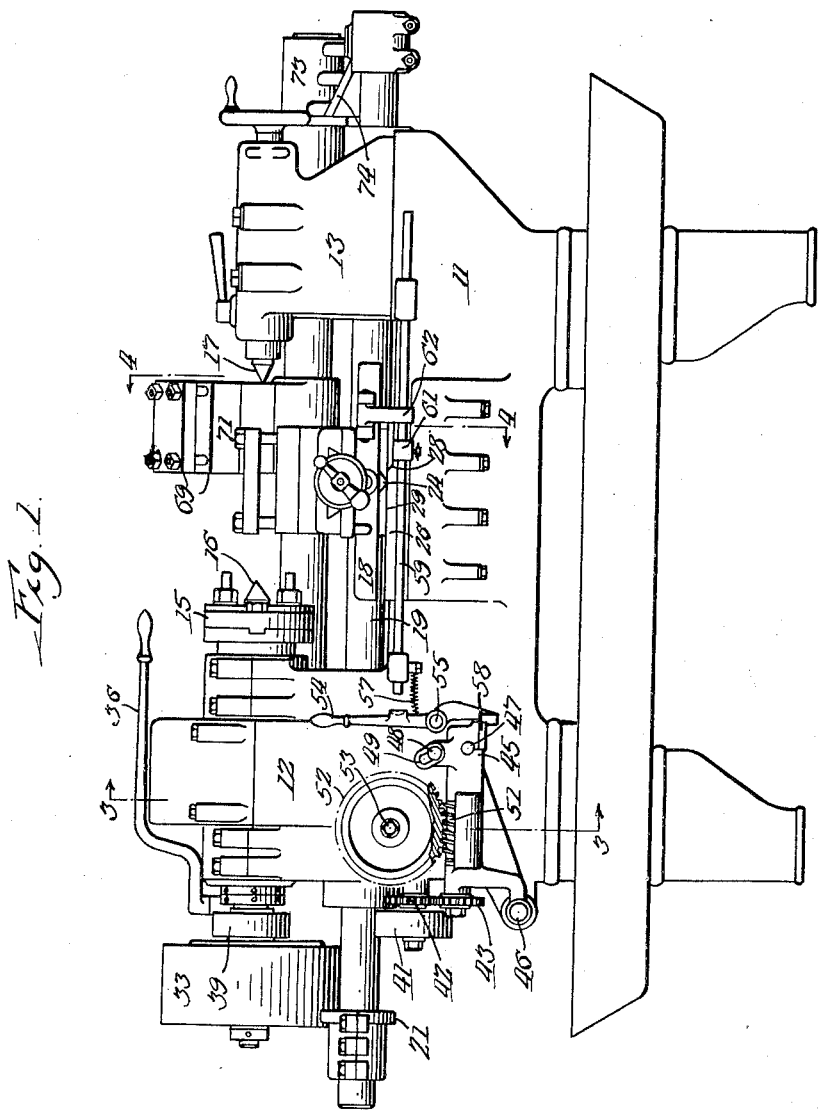

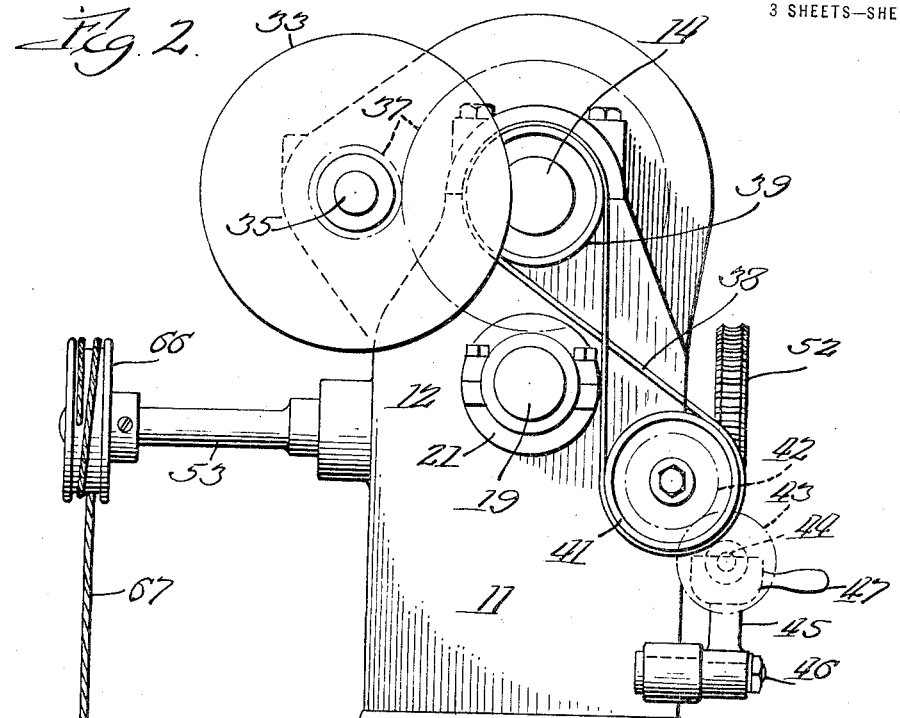
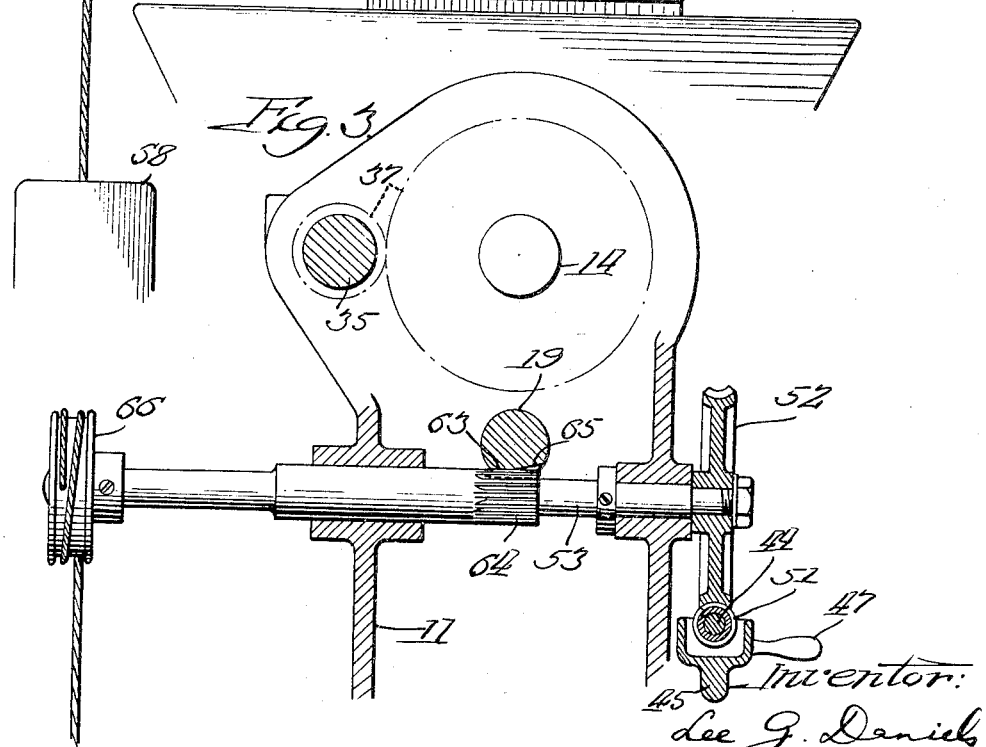

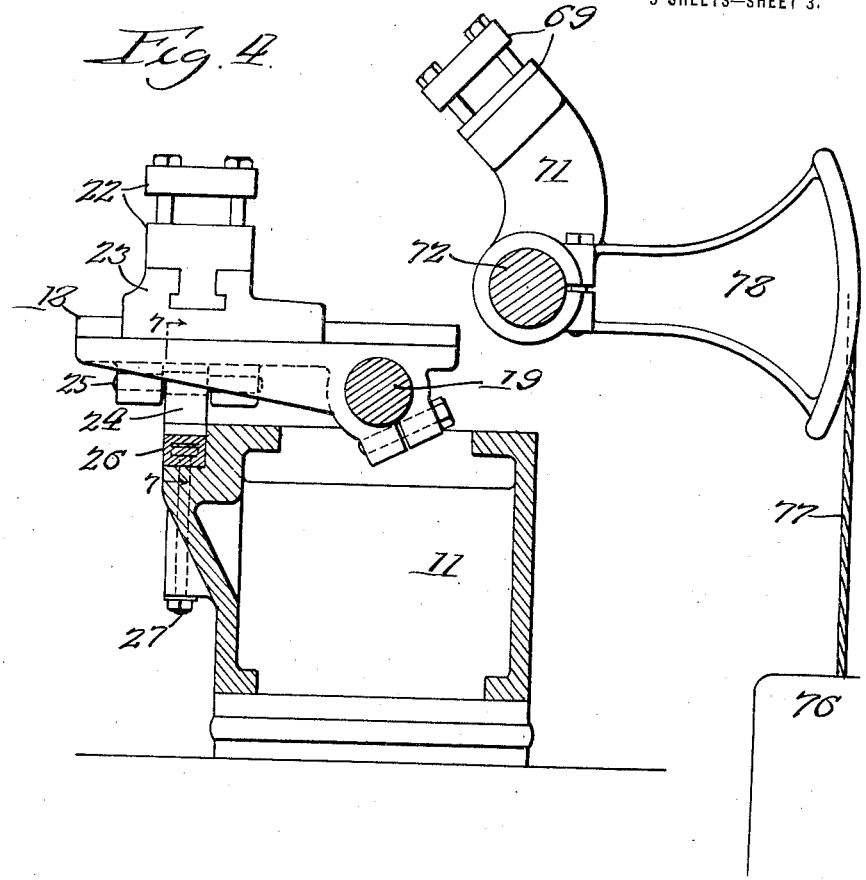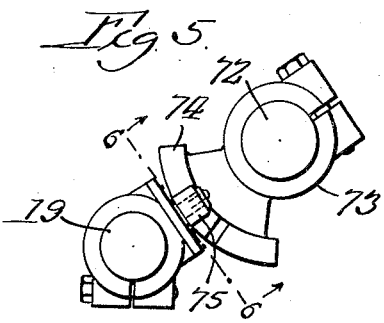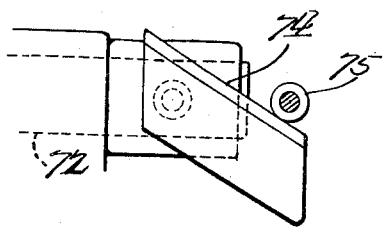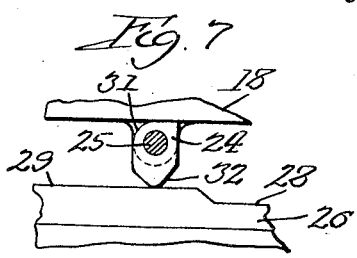

UNITED STATES PATENT OFFICE.

LEE G. DANIELS, OF ROCKFORD, ILLINOIS.

AUTOMATIC LATHE.

1,393,205. Specification of Letters Patent. Patented Oct. 11, 1921.

Application filed August 28, 1918. Serial No. 251,789.

*To all whom it may concern:*

Be it known that I, LEE G. DANIELS, a citizen of the United States, residing at Rockford, in the county of Winnebago and State of Illinois, have invented certain new and useful Improvements in Automatic Lathes, of which the following is a specification.

This invention relates to that class of lathes in which the work is revolved and facing and turning tool-carriers are automatically moved through a cycle of operation terminating in the return of the tools to a starting position.

The principal object of the present invention is to provide a machine of the character described, simplified and generally improved in construction with a view to securing the various movements of the tools by means of the fewest operating parts arranged in an exceedingly advantageous manner, whereby an exceptionally efficient and practical machine is obtained, which, because of its comparatively few parts and their simple design, is capable of being manufactured at a relatively low cost.

In furtherance of this general object, I have provided an automatic lathe characterized by the provision of a centrally disposed longitudinally slidable bar equipped with a tool carrier adapted to carry the turning tools, and an oscillatory bar in parallel relation with and preferably at the rear of the central bar and equipped with a fixed overhanging tool carrier or arm adapted to carry the facing tools. My invention contemplates the provision of novel means for reciprocating the central bar and other means operating between the bars for oscillating the facing-tool bar by the reciprocatory motion of the central bar.

Further objects are to provide an improved means for moving the turning tool carrier into and out of cutting position, to provide a simple means for driving the central bar including a pinion meshing with a rack on said bar, and to provide an improved automatic stop mechanism including a worm and gear which are unmeshed to stop the feed of the turning tool carrier without disturbing the drive of the worm.

Other objects and attendant advantages will be appreciated as the invention becomes better understood by reference to the following description when considered in connection with the accompanying drawings, in which—

Figure 1 is a front elevation of an automatic lathe embodying my improvements;

Fig. 2, an end elevation looking at the head end of Fig. 1;

Figs. 3 and 4, cross-sectional views taken substantially on the lines 3—3 and 4—4 respectively, of Fig. 1;

Fig. 5, a detail end view of the connection between the tool-carrier bars at the tail end of the machine;

Fig. 6, a detail sectional view taken substantially on line 6—6 of Fig. 5; and

Fig. 7, a fragmentary detail view illustrating the resting block at the front of the turning tool carrier.

My invention contemplates the provision of a lathe in which the blank or work is revolved and two tool carriers are provided, one at the front of the machine for carrying turning tools which are fed longitudinally of the bed and the other preferably at the rear of the machine for carrying facing tools which are moved toward and from the axis of the revolving work. These tool carriers are operated automatically to simultaneously perform given turning and facing operations. Inasmuch as my improvements relate principally to the mounting of these tool carriers and to the means by which they are automatically operated, I have illustrated in but a general way those parts of the machine the particular construction of which is not important. The well known parts comprise a bed designated generally by reference character 11, the head stock 12, tail stock 13, the spindle 14 journaled in the head stock and equipped with a center plate 15, and the centers 16 and 17.

The turning tool-carrier designated in general by reference character 18 is fixed to a heavy bar 19 mounted in suitable bearings in the head and tail stocks medially of the bed to slide lengthwise thereon and to oscillate. Viewing Fig. 1, it will be noted that this bar 19 extends beyond both ends of the bed and is equipped at its forward end with a buffer or stop 21 of any suitable or preferred construction, which by abutment against the head stock limits lengthwise movement of the bar and its tool carrier in one direction. A weight mentioned hereinafter moves the bar 19 in this direction in a quick traverse movement to return the tools to a starting position after the completion of the cutting operation; and a power driving mechanism, also described later, moves the bar 19 forwardly in the feed movement.

Referring to Fig. 4, it will be seen that the turning tool carrier 18 is rigidly secured to the bar 19 and carries tool-holding blocks or clamps 22 adjustable on a carriage 23 which in turn is adjustable on the carrier proper toward and from the axis of the work. This tool carrying means may be of any suitable or preferred construction, and as shown, is designed to carry between the blocks 22, a plurality of turning tools. The turning tools are brought into and out of cutting position by oscillating the carrier 18 about the axis of the bar 19. The forward end of the tool carrier 18 is equipped with a rest or thrust block 24, best shown in Fig. 7, which is mounted on the pivot pin 25 on the carrier and has a V-shaped end resting on a pattern plate 26 suitably secured to the bed as by means of the bolts 27. It will be manifest that when the tool carrier 18 is moved longitudinally, the position of the tools with respect to the work will be governed by the face of the pattern block 26 over which the resting block 24 is moved. As indicated in Fig. 1, the pattern block 26 has a low portion 28 and a high portion 29. When the tool carrier 18 is at its extreme right-hand position with its block 24 resting on the surface 28 the turning tools will be withdrawn from cutting position. This is the normal at-rest position of the tool carrier, and when the same is moved toward the head stock by lengthwise sliding movement of the bar 19 operated by the power mechanism, the resting block 24 will be moved up the incline on the pattern block leading to the raised surface 29, thereby bringing the tools into cutting position, the turning effect of the tools being governed by the shape of the surface 29, which in the present instance would produce a turned surface parallel with the axis of rotation. When the turning tool carrier has reached a predetermined point, the feed movement will be automatically stopped in the manner described hereinafter and the carrier will be quickly returned to the starting position. In order to withdraw the turning tools from the work at the instant of starting the return movement, one upper corner of the resting block 24 is cut away, as at 31, so that the block may freely rotate in a clockwise direction viewing Fig. 7, allowing the surface 32 to lower into contact with the pattern block, consequently, lowering the tool carrier and tools from operative position. It will be manifest that when the tool carrier is again moved forwardly, the resting block 24 will be returned to upright position as soon as the incline between the surfaces 28 and 29 is reached. This construction affords an exceedingly simple and practical means for controlling the position of the tools to produce a given pattern during the forward motion of the carrier and to automatically withdraw the tools during the retracting movement. It will be especially noted that the desired effect is produced without the use of auxiliary parts or devices.

The power-operated means for reciprocating the bar 19 in the feed movement, and the means for automatically stopping this feed movement and for retracting the bar will now be described. The pulley 33 drives the shaft 35 through the agency of a suitable clutch, not shown, which is adapted to be controlled by the hand shifting lever 36. By means of the gears 37 a direct driving connection is established between the shaft 35 and the spindle 14. Power is now taken from the spindle shaft to drive a feed shaft which imparts feed movement to the bar 19. The means for this purpose comprise in the present instance, the belt connection 38 between the pulley 39 on the spindle shaft and the pulley 41 on the bed fixed to a spur gear 42 which meshes with a gear 43 fixed to a worm shaft 44 carried by a frame designated generally by character 45, which is adapted to be moved into and out of operative position without unmeshing the gear 43. The frame 45 pivotally mounted on the bed 46 is equipped with a forwardly projecting handle 47 by means of which the frame may be raised from a lowered inoperative position limited by the fixed stop 48 and slot 49, to engage the worm 51 with the worm wheel 52 fixed to the feed shaft 53 which is journaled crosswise on the bed. The worm frame 45 is held in the raised operative position shown in Fig. 1, by means of a releasable catch in the form of a lever 54 pivotally mounted at 55 on the bed and having a detent end 56 constantly urged by the spring 57 into engagement with the plate 58 on the frame 45. The worm 51 has a left hand thread and the belt 38 is arranged to drive the worm in such direction that the tendency of the worm is to hold its conection with the gear 52. The handle 54 may be actuated by hand to release the frame which will fall by gravity to its inoperative position and thus withdraw its worm 51 from engagement with the worm gear 52 without unmeshing the gear 43. In operation the lever 54 will be automatically actuated to stop rotation of the feed shaft 53. For this purpose, a sliding rod 59, Fig. 1, is mounted on the bed in alinement with the lever 54 and equipped with an adjustable abutment 61 adapted to be actuated by the depending arm 62 which is fixed to the turning tool carriage. It will be readily seen that by properly adjusting the abutment 61 with respect to the work, the mechanism for advancing the turning tools in the feed movement will be put out of operation when the tools reach a predetermined point in their advance movement. Referring now to Fig. 3, it will be noted that the driving connection between the feed shaft 53 and the bar 19 is through the agency of a rack 63 on the bar and a pinion 64 on the shaft, and that the rack teeth are cut deeper at their forward sides as indicated at 65, to permit oscillation of the bar 19 to bring the tools into and out of operative position, as described above. The feed shaft 53 is extended on through to the rear of the machine and equipped with a drum 66 upon which a cable 67 is wound for carrying the weight 68. The cable will be wound onto the drum during the feed movement and when the lever 54 has been automatically tripped for throwing out the feed mechanism, the elevated weight will be free to fall and return the tool carrier 18 to starting position, limited as mentioned above by the buffer 21. This completes a cycle of operation, and when a new blank has been centered the machine may be put into operation again by simply raising the frame 45 to operative position.

My invention also provides novel means coöperating with the mechanism just described for moving the facing tools in the feed movement. The facing tools are adapted to be secured between the clamping blocks 69 at the upper end of an arm or carrier 71, which is fixed to and projects upwardly from an oscillatory bar 72 suitably journaled on the machine, as on the head and tail stocks in the manner shown. Means is now provided, operating directly between the bars 19 and 72, for oscillating the latter by longitudinal movement of the former. This means, best shown in Figs. 5 and 6, and located at the extreme rear of the machine, consists of an inclined camway carried by one of the bars and a follower carried by the other for transmitting the desired movement. In the present instance, the bar 72 is equipped with a fixed collar 73 carrying an inclined segmental camway 74 which is engaged by a roller cam follower 75 carried by the bar 19. The bar 72 is free to oscillate in its bearings and is constantly forced in a clockwise direction viewing Fig. 4, by means of a weight 76 connected by a cable 77 to a segmental arm 78 fixed to and extending rearwardly from the bar. This movement of the bar 72 under the influence of the weight 76 is limited by contact of the cam 74 against the roller 75. Viewing Fig. 6, it will be manifest that as soon as the roller 75 travels in a horizontal path by longitudinal sliding movement of the bar 19 during the feed movement the roller acting on the cam 74 will oscillate the bar 72 in a counter-clockwise direction viewing Fig. 4, against the force of the weight 76. Thus, the feed of the facing tool carrier is obtained by and through a feed movement of the turning tool carrier, or rather the sliding movement of the bar 19, and when the feeding mechanism is automatically thrown out of operation, as described above, both the weights 68 and 76 will quickly return the tool carriers to the starting position. Attention is called to the simple coöperation between the tool carrying bars 19 and 72, whereby the various movements of the tools are effected through the agency of but very few parts designed to transmit the power in a most direct manner. The terms "turning tools" and "facing tools" are simply used as illustrative of the different types and functions of the tools used by the two tool carriers, as these tools are generally understood in machine shop practice. It should be understood, therefore, that the use of such terms in the claims is simply comparatively illustrative of the two carriers employed in a lathe of the character to which the present invention relates.

It is believed that the foregoing conveys a clear understanding of the construction and operation of my improvements and of the objects prefaced above, and it should be understood that while I have illustrated and described but a single working embodiment, various changes might be made in the proportions, construction and arrangement without departing from the spirit and scope of the invention as expressed in the appended claims.

I claim:

1. In a lathe, the combination of a bed, means for revolving a blank, a bar mounted centrally on the bed to slide longitudinally, a tool carrier adapted to be moved longitudinally by said bar, an oscillatory bar mounted on the bed in parallel relation with and at the rear of the central bar, a tool carrier fixed to the oscillatory bar and adapted by oscillation thereof to carry its tools toward and from the axis of the revolving blank, and means operating between said bars for oscillating the one by longitudinal movement of the other.

2. In a lathe, the combination of a turning tool-carrier and a longitudinally movable bar for moving this carrier, a facing tool carrier and an oscillatory bar for oscillating the same, an inclined cam way carried by one of the bars, and means on the other bar coöperating with said cam way for causing the facing tool carrier to be oscillated by longitudinal movement of the turning tool carrier.

3. In a lathe, the combination of a bed having a head and tail stock, a bar longitudinally slidable on the bed and extending beyond both ends thereof, a tool carrier adapted to be moved longitudinally with said bar, a second tool carrier adapted to be moved toward and from the axis of the revolving work, means for moving said bar longitudinally, a stop carried by the end portion of the bar extending from the head of the lathe for limiting movement of the bar in one direction, and means carried by the end portion of the bar extending from the tail of the lathe for causing the second mentioned tool carrier to be moved toward the axis of the work when said bar is moved longitudinally.

4. In a lathe, the combination of an oscillatory bar and a longitudinally slidable bar mounted in parallel relation, a tool carrier for each bar adapted to be respectively moved by oscillatory and longitudinal movements of said bars, and means operating between the bars for oscillating the oscillatory bar by longitudinal movement of the other bar.

5. In a lathe, the combination of an oscillatory bar and a longitudinally slidable bar mounted in parallel relation, a tool carrier connected to each bar, an inclined camway on one of the bars, means on the other bar coöperating with said inclined camway for oscillating the oscillatory bar when the other bar is moved longitudinally, and means for moving the latter bar longitudinally.

6. In a lathe, the combination of a bed, a head stock and a tail stock, a bar slidable longitudinally in bearings on the head and tail stocks, a tool carriage movable lengthwise on the bed between the head and tail stocks and connected with said bar to move longitudinally therewith, a rack on the bar, and a pinion meshing with the rack for moving the same longitudinally.

7. A metal working machine comprising a head stock and a tail stock, a work spindle in the head stock, a bar interposed between and mounted in bearings on the head and tail stocks and slidable axially in said bearings, a tool carriage mounted upon said bar intermediate the head and tail stocks so as to move in a plane parallel with the axis of the work spindle when said bar is moved axially, power-operated means for moving said bar axially, a second bar interposed between and mounted in bearings on the head and tail stocks and adapted to be oscillated in said bearings, a tool carrier fixed to the second bar and adapted by oscillation thereof to carry its tool toward and from the axis of the work spindle, and means operating directly between said bars for oscillating the second bar by axial movement of the first bar.

8. A metal working machine comprising a head stock and a tail stock, a work spindle in the head stock, a bar interposed between and mounted in bearings on the head and tail stocks and slidable axially in said bearings, a tool carriage mounted upon said bar intermediate the head and tail stocks so as to move in a plane parallel with the axis of the work spindle when said bar is moved axially, power-operated means for moving said bar axially, a second bar interposed between and mounted in bearings on the head and tail stocks and adapted to be oscillated in said bearings, a tool carrier fixed to the second bar and adapted by oscillation thereof to carry its tool toward and from the axis of the work spindle, said bars each extending rearwardly beyond the end of the tail stock, and means operating directly between said extended ends of the bars for oscillating the second mentioned bar by axial movement of the first mentioned bar, whereby to move the tool carrier of the second mentioned bar toward and from the work simultaneously with feed movement of the tool carriage.

9. A metal working machine comprising a head stock and a tail stock, a bar interposed between and slidably mounted in bearings in the head and tail stocks, a turning tool carriage mounted upon said bar between the head and tail stocks so as to be moved axially of the work spindle by reciprocation of said bar, a rack on the bar, a drive pinion meshing with the rack, power-operated means for driving said pinion to impart feed movement to the bar and including means for automatically disconnecting the drive and leaving the said pinion free to revolve, means urging the pinion to revolve in a direction to return the bar to a starting position, and a stop on said bar for limiting the return of said bar and its tool holder.

10. In a metal working machine, the combination of a suitable frame, a work spindle revolubly mounted thereon, a bar mounted on said frame parallel with the work spindle and adapted to move axially, a tool carriage mounted upon and carried by said bar so as to be moved lengthwise of the spindle axis by similar movement of said bar, a rack on said bar, a gear meshing with said rack, mechanism for driving said gear to impart feed movement to said tool carriage, means for automatically disconnecting said driving mechanism from said gear, and means constantly urging said gear to revolve in a direction for returning the tool carriage to a starting position, whereby upon disconnection of said driving mechanism the bar and its tool carriage will be automatically returned to a starting position.

11. In a metal working machine, the combination of a work spindle, a longitudinally slidable bar parallel with the work spindle, a turning tool carrier mounted upon and moving with said bar, means for moving the bar longitudinally, a second bar parallel with the work spindle and carrying a facing tool carrier, and means operating between said bars for oscillating the second mentioned bar by longitudinal movement of the first, whereby both tool carriers will be simultaneously operated in feed movements by and through lengthwise movement of the first mentioned bar.

12. In a metal working machine, the combination of a frame, a work spindle, a longitudinally slidable bar mounted on the frame parallel with the work spindle, a tool carriage rigidly mounted on the bar and extending laterally therefrom, a form plate against which the laterally extended end of the carriage bears for determining the cutting effect of the tool when the bar is moved longitudinally, the carriage and bar being capable of oscillatory movement for moving the tool toward and from the work, a rack on said bar, and a gear meshing with the rack for moving the bar and its carriage lengthwise of the work and simultaneously effecting movement of the tool toward and from the axis of the work.

13. In a metal working machine, a bed having a head stock and a tail stock, a work spindle on the head stock, a bar interposed between the head and tail stocks and slidable axially in bearings therein parallel with the work spindle, a tool holder mounted upon and movable lengthwise with said bar, a transverse shaft journaled in the head stock and having a gear in mesh with a rack face on said bar, a worm gear fixed to the front end of said shaft, a worm meshing with said gear, means for driving said worm, means adapted to be actuated by lengthwise movement of said bar for disengaging the worm from its gear when the tool carrier has been moved lengthwise a predetermined distance in its feed movement, and means on the opposite end of said transverse shaft constantly tending to revolve the same in a reverse direction, whereby to return the bar and its tool holder to a starting position upon disconnection of said driving mechanism.

14. In a metal working machine having a head stock, a tail stock and a work spindle mounted in the head stock, a bar interposed between and slidable lengthwise in bearings in the head and tail stocks, a tool carriage between the head and tail stocks and movable in a plane parallel with the axis of the work spindle by sliding movement of said bar, a rack on the bar, and means coöperating with the rack for moving the bar and likewise the tool carriage lengthwise in a feed movement.

15. In a metal working machine of the character described, the combination of a bed carrying a head stock and a tail stock, a bar interposed between and slidably mounted at its end portions in bearings in the head and tail stock ends of the machine, a turning tool carriage mounted upon said bar between the head and tail stocks whereby to be fed lengthwise of the work by similar movement of the bar, a facing tool carriage movable crosswise of the bed toward and from the work, power operated means for moving said bar lengthwise to thereby impart feed movement to the turning tool carriage, and means operated by said lengthwise movement of said bar for moving the facing tool carriage in a feed movement.

16. In a metal working machine, a head stock and a tail stock, a work spindle on the head stock, a bar slidable lengthwise in bearings in the head and tail stocks, a turning tool carriage mounted on said bar so as to move lengthwise therewith to and fro between the head and tail stocks, a rack on said bar, and a power driven pinion meshing with the rack for moving the bar and its turning tool carriage in a feed movement.

17. In a metal working machine of the character described, the combination of a bed carrying a head stock and a tail stock upon and between which the work is supported to be turned, a turning tool carriage interposed between the head and tail stocks, a bar slidably supported adjacent to each end in bearings in the head and tail stock ends of the machine, rack teeth on said bar, a power driven gear meshing with said rack teeth for moving the bar lengthwise in said bearings, and means connecting the turning tool carriage and the bar whereby said carriage will be fed lengthwise of the work by operation of said gear.

18. In a lathe, the combination of a head stock and a tail stock between which is carried the work to be turned, a tool carriage, a bar parallel with the axis of the head stock and slidable longitudinally in a bearing in the head stock, the bar having rack teeth within the head stock, and a gear meshing with said teeth for moving the bar lengthwise and consequently moving the tool carriage.

19. In a lathe, the combination of a head stock and a tail stock by and between which work is supported to be turned, a tool carriage interposed between the head and tail stocks and adapted to carry a tool for operating on said work, a bar mounted at opposite ends to slide lengthwise in bearings in the head and tail stocks and connected intermediate the head and tail stocks with said tool carriage for moving the same with respect to the work upon lengthwise movement of the bar in said bearings.

20. In a metal working machine of the character described, the combination of a bed carrying a head stock and a tail stock upon and between which the work is adapted to be supported and revolved, a bar parallel with the work axis and mounted adjacent to its ends for lengthwise sliding movement in bearings at the head and tail stock ends of the machine, a turning tool carriage mounted on said bar between the head and tail stocks and adapted to be fed lengthwise of the work by similar movement of said bar, a back facing tool carriage mounted to move crosswise of the bed toward and from the work, and means operated by lengthwise feed movement of said bar for feeding the back facing tool carriage toward the work.

21. In a lathe, the combination of a lengthwise moving tool carriage, a back bar, a cross tool carriage and a segment cam carried by the back bar, and means coöperating with the segment cam for oscillating said bar.

22. In a lathe, the combination of a head stock and a tail stock, a front carriage bar slidable lengthwise in bearings in the head and tail stock, a back carriage bar, a rack on the front carriage bar, and a cam and roller operative between said bars for moving the back carriage toward the work upon lengthwise movement of the front carriage bar.

23. In a lathe, the combination with a base carrying a live and dead center for supporting the work, a bar coplanar with said centers and axially movable to feed the turning tool carriage lengthwise of the base, a cross power shaft having a driving connection with said bar for directly transmitting feed movement thereto, a back facing tool carriage movable toward and from the center axis, and means for transmitting the rotary movement of said transverse shaft to the facing tool to feed the same toward said center axis.

24. In a metal working machine of the character described, the combination of a bed carrying a head stock and a tail stock, a bar interposed between and slidably mounted in bearings in the head and tail stock ends of the machine, a turning tool carriage mounted upon said bar between the head and tail stocks whereby to be fed lengthwise of the work by similar movement of the bar, a rack on the bar, a driving pinion meshing with said rack, power operated mechanism for driving said pinion to impart feed movement to the bar and turning tool carriage, and means for automatically stopping said feed of the bar at a predetermined point in the feed movement.

25. In a metal working machine of the character described, the combination of a bed carrying a head stock and a tail stock, a bar interposed between and slidably mounted in bearings in the head and tail stock ends of the machine, a turning tool carriage mounted upon said bar between the head and tail stocks whereby to be fed lengthwise of the work by similar movement of the bar, a transverse shaft at the head stock end of the machine for moving the bar in a feed movement, power-operated mechanism for driving the transverse shaft including means for disconnecting said drive, and means actuated by feed movement of the bar for disconnecting said drive at a predetermined point in such feed movement.

LEE G. DANIELS.

Witnesses:
JOHN F. McCANNA,
DELLA ATKINSON.